Feb. 26, 1957     C. J. D'ANGIO     2,783,085
VAPOR DIFFUSER DEVICES
Filed July 8, 1954
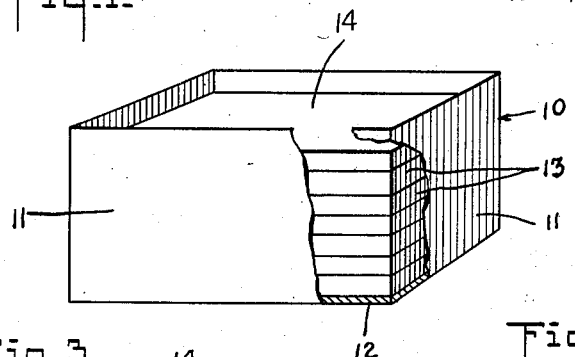
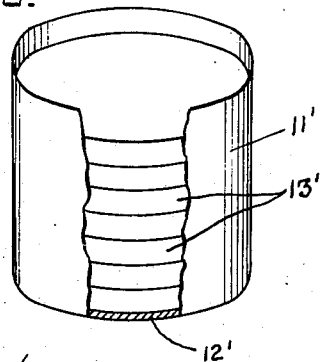
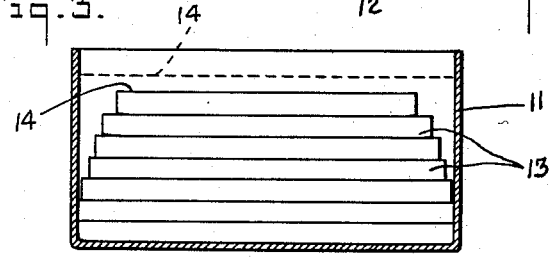
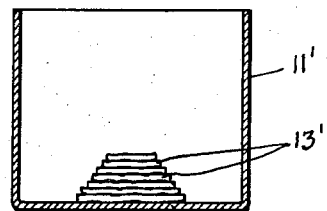
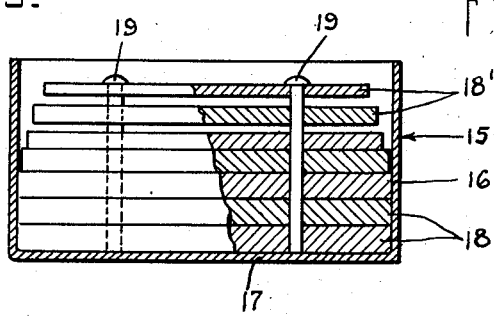
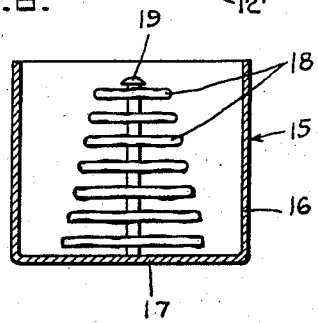
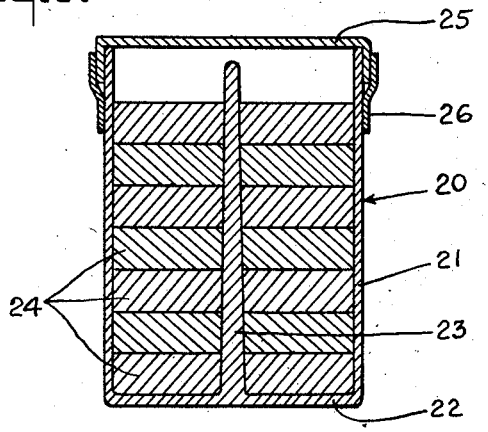
INVENTOR.
CLAUDE J. D'ANGIO
BY
ATTORNEY

United States Patent Office 2,783,085
Patented Feb. 26, 1957

2,783,085

VAPOR DIFFUSER DEVICES

Claude J. D'Angio, Forest Hills, N. Y., assignor to Airkem, Inc., New York, N. Y., a corporation of New York Application July 8, 1954, Serial No. 442,123

10 Claims. (Cl. 299—24)

This invention relates to vapor diffusing devices and particularly to vapor diffusing devices for introducing into air a mixture of volatile air treating components evaporated from bodies of air treating gel. More particularly the invention relates to air treating devices of the class described wherein means is provided for progressively exposing fresh surfaces of gel for evaporation as volatilization of the air treating components progresses.

The utilization of air treating gels and segmented air treating gels for introducing volatile air treating components into air has been disclosed in co-pending applications of Turner et al. Serial Nos. 178,508 and 178,557, both filed August 9, 1950, since combined and issued as U. S. Patent No. 2,691,615 dated October 12, 1954. These gels comprise 96 to 99% of an aqueous medium of which 1 to 10% is made up of a compatable mixture of volatile air treating components which normally volatilize at different rates, the said liquid medium being solidified by 1 to 4% of an aqueous gelling agent, the amount of gelling agent with respect to the quantity of liquid medium being such that the gel obtained is firm and substantially devoid of syneresis. Gels of this type have been described as having the property of emitting during evaporation of the gel a vapor mixture of substantially uniform quality. Furthermore, when a body of gel is segmented or cut so as to expose fresh areas of gel as evaporation progresses, these gels have been described as emitting uniform quality vapors at a substantially uniform rate.

It has now been found that while the teachings of said Turner et al. applications apply to relatively small bodies of gel of the type which might be used in normal domestic or household air treating operations, the benefits are somewhat retarded when larger gel bodies are employed as for example in introducing air treating components to air conditioning systems, railroad cars, and the like.

With a relatively small body of gel uniformity of quality of emitted vapors is provided by reason of the fact that the mixture of water and volatile components within the gel diffuses very slowly to the surfaces of the gel, so that as each increment of the mixture reaches the gel surface it can completely evaporate before the next increment of mixture replaces it. As the size of a gel body is increased however, it is found that the surface of the gel tends to become encrusted as evaporation progresses eventually retarding further diffusion of the volatile components through the encrusted surface. Such encrusting on the surface may be accompanied by the contaminating effect of dust and other foreign substances in air which is circulated about the gel.

The result of such hardening or crusting of the gel surface when a large body of gel is employed can be objectionable not only because of an intereference with the emission of uniform quality vapors from the gel, but also because the contaminants which may have been picked up by the gel surface can themselves give off an odor detracting from the effectiveness of the mixture of volatile air treating components originating in the gel. While an "off odor" due to contamination may in some instances be distinct and characteristic of the environment in which the gel has been exposed; it is generally a more subtle staleness, difficult to describe but readily dictable when contaminated and fresh air treating gels are compared.

It has been discovered in accordance with the present invention that the object of maintaining uniformity in the quality of vapors emitted from an evaporating gel can be more fully achieved, particularly in instances where relatively large gel masses are involved, by arranging a plurality of relatively thin gel slabs in superimposed or laminated fashion within a closely conforming container generally defined by side and bottom walls and open at the top. The side walls of the conforming container can be of any desired contour such as round, square, rectangular, or the like, but it is important that the gel slabs closely conform to the particular side wall contour. When the open end of such a container is exposed to permit evaporation of volatile components from the gel, the uppermost slab or layer of gel will evaporate first causing shrinkage to take place which ultimately withdraws peripheral edges of the uppermost slab from the container walls thereby exposing surfaces of the next lower slab of gel. This sliding movement as the upper slab of gel contacts may be and in fact frequently is accompanied by a warping or crinkling of the upper slab to cause a partial separation between abutting surfaces of the uppermost and next lower gel slab. As evaporation continues the second slab in turn commences to shrink exposing portions of the third slab while the top slab continues to further shrink as volatile components thereof are given off. In this way the series of gel slabs within the confining container gradually break away from the container walls until the lowermost slab is exposed and in turn starts to shrink. At this point the series of gel slabs have the appearance of a pyramid with the slabs being progressively smaller from the bottom to the top of the stack of gel slabs.

The progressive exposing of fresh areas as successive gel slabs break away from the container wall, supplemented by the partial separation between successive slabs due to warping of the gel bodies as they shrink, markedly enhances the performance during evaporation of a large mass of gel. This enhanced performance is due to a combination of direct benefit resulting from the progressive exposing of fresh gel areas, and an indirect benefit resulting from the fact that the individual slabs of gel are sufficiently small so that volatile components can escape therefrom before the gel surface becomes sufficiently contaminated to interfere with the gel performance.

The advantages thus obtained by employing a plurality of laminated gel slabs in a confining container can be further augmented by employing one or more pin elements penetrating the several superimposed gel slabs. It is found that when such pins are employed the contracting gel closely envelops the pin or pins and supports the successive gel slabs or layers against settling as evaporation progresses. This insures the separation of successive layers of gel as evaporation progresses, thus providing a maximum exposure of fresh gel surfaces.

The new vapor diffusing device in accordance with the present invention will be more readily understood from a consideration of the accompanying drawing in which certain adaptations of the invention are disclosed with the various parts thereof being identified by suitable reference characters in each each of the views, and in which:

Fig. 1 is a perspective view of one form of the device in accordance with the invention with part of the structure broken away.

Fig. 2 is a view similar to Fig. 1 showing a modified external contour to the device;

Fig. 3 is a sectional view of the device as shown in

Fig. 1 with the gel mass partially consumed through evaporation;

Fig. 4 is a sectional view of the device as shown in Fig. 2 (or an end view of the device as shown in Fig. 1) with the gel mass substantially all evaporated;

Fig. 5 is a view similar to Fig. 3 showing the gel bodies engaged by a plurality of pins and indicating initial stages of separation of the gel bodies as engaged by the pins;

Fig. 6 is a view similar to Fig. 4 showing spent gel bodies in engagement with a supporting pin; and Fig. 7 is a sectional view through a modified form of the device with the supporting pin comprising an integral part of the container, and showing a typical closure for the container during periods of storage.

As shown in Figs. 1 and 2 of the drawing a container 10 of generally rectangular contour having side walls 11 and bottom wall 12 is filled with a plurality of slabs 13 of air treating gel which initially conform closely to the inner surfaces of the side walls 11. The surface 14 of the uppermost slab assumes the position which is indicated in the dotted lines in Fig. 3 of the drawing.

The showing in Fig. 3 of the drawing indicates the shrinkage and contraction of the slabs 13 which has taken place after the gel is partially spent through evaporation. The upper slabs have contracted and withdrawn from the side walls 11 and the upper surface has receded from the dotted line position to the lower position as indicated in Fig. 3.

The device as shown in Fig. 2 is similar to that shown in Fig. 1, except that the side walls 11' and bottom wall 12' are essentially round or cylindrical in contour. The series of gel slabs 13' conform closely to this circular or cylindrical contour. Evaporation of the gel slabs as shown in Fig. 2 proceeds in the same manner as described in connection with Fig. 3 and as evaporation continues, the gel slabs pull completely away from the side walls and when substantially all evaporated form a small pyramid of dry and warped gel residues as shown in Fig. 4. The lowermost of the slabs 13' may be somewhat larger than the uppermost slabs due to a slight retarding of evaporation of the lower slabs at points where successive slabs remain in close contact. Thus the spent residues may assume a pyramid-like contour of the type shown in Fig. 4.

Figs. 5 and 6 show a modified form of the device wherein a container 15 having side walls 16 and bottom wall 17 is filled with a plurality of gel slabs 18 which initially all conform to the side wall contour. Pins 19 are inserted in the stack of gel slabs 18 so as to engage all of the slabs. A single pin may be employed in a container of round or cylindrical contour, whereas two or more pins 19 may be employed in containers of rectangular or other irregular contour.

As shown in Fig. 5 the gel slabs are partially consumed through evaporation and it will be seen that the uppermost slabs 18' have completely separated one from the other due to the contracting or bonding of the gel around the pins 19. It will be evident that this complete separation of the gel slabs exposes large fresh areas of gel for evaporation of volatile components. With this form of device the uppermost slabs 18' tend to be more completely consumed before the lowermost of the slabs 18 commence to contract and pull away from the side walls 16. When fully consumed, however, the gel slabs assume a relative position substantially as shown in Fig. 6 of the drawing with each of the slabs 18 being separated from each other and from the container walls and supported in this relationship by the pin or pins 19.

The pins 19 can comprise separate pin elements which are merely inserted through the stack of laminated gel bodies or if desired, can comprise integral parts of the container. In Fig. 7 of the drawing there is shown such a modification wherein the container 20 comprises an integral body of cast or molded material embodying side walls 21, bottom wall 22 and pin member 23. These parts have been shown as having a very slight taper (exaggerated in the drawing) such as would permit molding the container 20 of plastic material, or the like. In Fig. 7 several slabs 24 of gel are shown as closely engaging inner surfaces of the side wall 21 and the pin 23. For purposes of illustration the device as shown in Fig. 7 is provided with a removable lid 25 and sealing strip 26 of the type which may be employed for closing the device during periods of storage and shipment and until it is desired that the device might be exposed for evaporation. It will be understood however, that any type of closure means can be employed for thus sealing the device.

The pin elements as employed in Figs. 5 to 7 can be fashioned from various material, such as metals, plastics, and the like and if desired can be provided with irregular surface contours to enhance the anchoring and retention of gel bodies thereon. It is found however, that even with a smooth surface contour on the pins the contraction of the gel bodies is generally sufficient to support the gel bodies in their spaced relation one to the other as they are consumed through evaporation.

The thickness of gel slabs to employ in devices of the type disclosed can be varied within rather wide limits. Thus slabs as thin as about ⅛ inch or as thick as about ½ inch, or slightly greater can suitably be employed in different sizes and types of outer containers.

Similarly the number of separate slabs or layers of gel can be varied in adapting the diffuser devices to particular air treating operations. It will also be understood that the diffusing devices can be utilized in different ways, as for example by merely setting a device on a shelf or other supporting surface in an environment to be treated or by suitably associating the device with air passages or ducts of a circulating or air conditioning system, or the like.

While the advantages of the new air treating device herein disclosed are most pronounced in the handling of large gel masses as above described it will be apparent that the principles herein disclosed can be employed in devices of many types and sizes wherever air treating components are to be introduced into air by evaporation of gel masses.

Various changes and modifications in the vapor diffusing devices herein disclosed will occur to those skilled in the art and to the extent that such changes and modifications are embraced by the appended claims, it is to be understood that they constitute part of my invention.

I claim:

1. A vapor diffusing device comprising a container part having side and bottom walls and being open at the top thereof, a plurality of slabs of air treating gel in stacked arrangement within said container, said slabs being parallel to the bottom wall of the container and the peripheral edges of said slabs closely conforming to the side wall contour of the container, and said slabs being formed of air treating gel comprising an aqueous medium containing volatile air treating components and solidified by means of about 1 to 4% of an aqueous gelling agent, said air treating gel having the property of contracting and shrinking as volatile components evaporate therefrom, the contraction of each gel slab operating to progressively expose for evaporation fresh gel surfaces on the next lower slab until all slabs have receded from the side walls of the container, said device including at least one pin element extending through the gel slabs substantially perpendicularly to the base of said container, and said pin element providing means for supporting the contracting gel slabs against vertical displacement whereby evaporation of the gel results in a progressive separation of successive gel slabs one from the other exposing the intermediate surfaces for evaporation of air treating vapors.

2. A vapor diffusing device as defined in claim 1 wherein the pin element is separate from the container part.

3. A vapor diffusing device as defined in claim 1 wherein the pin element comprises an integral part of the container.

4. A vapor diffusing device as defined in claim 1 wherein the container and pin element comprise a unitary molded part with the pin element arranged within the container and extending from the inner surface of the bottom wall substantially to the open end of the container.

5. A vapor diffusing device as defined in claim 1 having means for sealing the open end thereof to prevent evaporation of volatile gel components during periods of storage and shipment.

6. A vapor diffusing device as defined in claim 1 wherein the gel slabs are of uniform thickness.

7. A vapor diffusing device as defined in claim 1 wherein the gel slabs are of uniform thickness, and the thickness of each gel slab is within the range of about ⅛ inch to ½ inch.

8. A vapor diffusing device comprising a container having side and bottom walls and an open top, a plurality of slabs of air treating gel stacked on the bottom wall of said container with peripheral edges thereof closely conforming to the side wall contour of the container, said air treating gel being of low solid content whereby evaporation of volatile components from the gel causes progressive shrinkage of the gel slabs with substantial reduction in the transverse dimensions and thickness of each gel slab, and said device including a supporting element extending through the plurality of gel slabs preventing vertical displacement of the slabs as they contract due to evaporation.

9. A vapor diffusing device as defined in claim 8 wherein the supporting element is a pin penetrating the gel slabs but otherwise independent of said container.

10. A vapor diffusing device as defined in claim 9 wherein the supporting element is a pin integral with the bottom wall of said container.

References Cited in the file of this patent

UNITED STATES PATENTS

| | | |
|---|---|---|
| 1,347,226 | McQuitty | July 20, 1920 |
| 1,578,122 | Higgins | Mar. 23, 1926 |
| 2,042,581 | Blount | June 2, 1936 |
| 2,691,615 | Turner | Oct. 12, 1954 |